(No Model.)
C. C. STUART.
WEIGHING SCALE.
No. 458,322.
Patented Aug. 25, 1891.
Fig. 1.
Fig. 2.
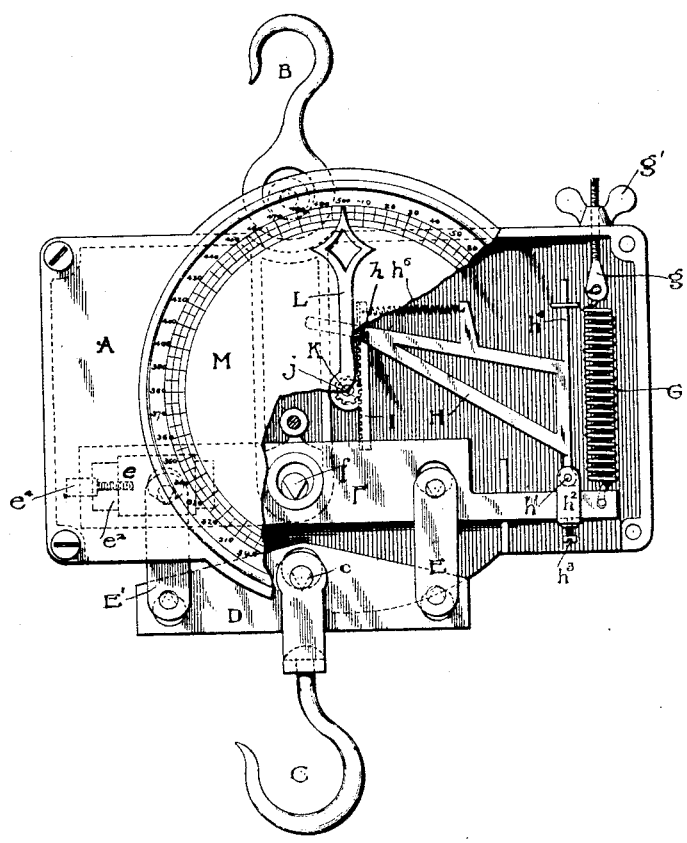
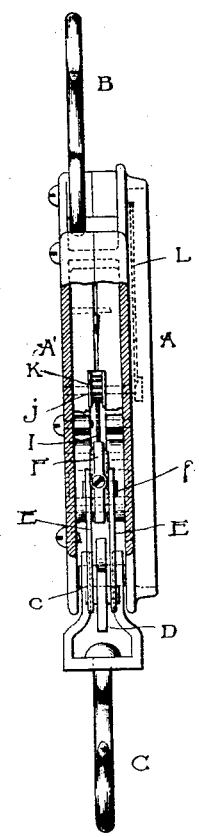
Witnesses
Inventor
C. C. Stuart
By his Attorneys
Phil. T. Dodge

UNITED STATES PATENT OFFICE.

CHARLES C. STUART, OF SMITHVILLE, NEW JERSEY.

WEIGHING-SCALE.

SPECIFICATION forming part of Letters Patent No. 458,322, dated August 25, 1891.

Application filed May 16, 1889. Renewed June 8, 1891. Serial No. 395,573. (No model.)

*To all whom it may concern:*

Be it known that I, CHARLES C. STUART, of Smithville, in the county of Burlington and State of New Jersey, have invented certain Improvements in Weighing-Scales, of which the following is a specification.

The aim of my invention is to provide a compact, sensitive, and accurate scale adapted for weighing heavy as well as light loads and combining the desirable qualities of a differential beam-scale and an ordinary spring-scale.

In the accompanying drawings, Figure 1 is a face view of my improved scale, a portion of the front plate being broken away to expose the internal construction. Fig. 2 is an edge view of the scale with portions broken away as in the preceding figure.

The frame or body of the scale consists, essentially, of vertical front and back plates A and A', connected rigidly together by intervening posts, flanges, or other suitable connections.

At the upper edge the body is provided with a hook B or equivalent suspending device pivoted or otherwise attached thereto.

C represents a hook to receive the load, located below the body and directly under the hook B. It is suspended by knife-edge bearings $c$ from the middle of a horizontal bar or lever D, which is in turn suspended at its two ends by the links E E' from the horizontal beam F, which latter is in turn supported midway between the links by bearings $f$, seated in the main frame.

The various bearings are preferably made of the usual knife-edge pattern, as shown in the drawings; but any other approved form of frictionless bearings may be employed.

The respective links are connected either to the beam F or to the bar D at slightly-different distances from the intermediate axis, so that there will be a slight preponderance of weight on one end of the beam F, as in the so-called "differential beam-scales," which are familiar to all persons skilled in the art.

In the form shown in the drawings (see Fig. 1) the distance between the fulcrum $f$ of the beam F and the upper fulcrum of link E' is slightly less than the distance between the fulcrum $f$ and the upper fulcrum of link E.

The right end of the beam F, which in this example receives the preponderance of weight, is suspended by a spiral spring G, the upper end of which is attached to a screw $g$ and passed through a supporting and adjusting screw $g'$, seated on the top of the frame, in order that the tension of the spring may be varied. The link E' has its upper bearing seated in a block $e$, arranged to slide horizontally in grooves or other guides $e^2$ in the beam F, a screw or equivalent adjusting device $e^4$ being applied to effect the horizontal adjustment and to secure the bearing in the exact position required. By thus shifting the bearing the leverage of the beam may be varied as required to bring the scale to the proper adjustment.

To the elongated end of the beam F, I have jointed a vertically-moving arm or plate H, which extends inward to the center of the frame, where it is connected by a pivot $h$ to the upper end of a rack-bar I, which engages a pinion J, fixed on a horizontal spindle or arbor K, mounted in the main frame and provided at its front end with a hand or pointer L, arranged to sweep over a graduated dial-plate M, formed upon or applied to the front of the main frame.

When a weight is applied to the hook C, it acts through the intermediate connections to overcome the spring G and depress the right end of the beam F, and with it the arm H, which latter, through the rack-bar I and pinion J, acts to turn the pointer until it indicates upon the dial the weight of the load.

I prefer to connect the arm H at its lower end by a pivot $h'$ to a sliding block $h^2$, encircling the end of the beam F and secured by a set-screw $h^3$. This admits of the connection being shifted to and from the axis of the beam, which may be required in adjusting the parts for action.

At the top the arm H is provided with a vertical guide-rod $h^4$. The rack-bar is pivoted to the arm H in order that the latter may be adjusted horizontally without effecting the engagement of the rack with the pinion, a spring $h^6$ being applied, as shown, between the arm H and the upper end of the rack-bar to keep the latter in operative position. It will be seen that the pivoted spring-actuated bar is thus enabled to adjust itself freely to the changing relations of the pinion and the arm H.

In some cases the connection of the arm H to the beam may be a rigid one, in which event the pivotal connection between the rack-bar and arm H may be omitted.

The essence of my invention resides in the combination, with the stationary supporting-case and its dial, of the parallel differential beam, a resisting-spring applied thereto, and an indicator or pointer connected to the beam by intermediate gearing, and it will be manifest to the skilled mechanic that the details are susceptible of various modifications without changing essentially the mode of action or departing from the limits of my invention.

The adjustability of the bearing of link E', or, in other words, the change in the leverage, may be utilized to adapt the scale for weighing very heavy or very light loads. In such case the dial should have two sizes of graduations.

Having thus described my invention, what I claim is—

1. In an automatic weighing-scale, the combination of a case or body provided with a suspending device and a dial-plate, a pointer pivoted therein and arranged to sweep over the dial, a differential beam fulcrumed in the case and provided with means for sustaining the load, a spring connecting the case and beam to resist the movement of the latter under the influence of the load, and gearing, substantially as described, connecting the beam and pointer.

2. In an automatic scale, the combination of the case or body provided with a suspending device, the beam F, fulcrumed in the body, the bar D, suspended from the beam by differential links and provided with means for sustaining the load, the spring connecting the end of the beam F with the body, the arm H, connected to the beam, the rack-bar connected to said arm, the pinion, the pointer connected to the pinion, and the graduated plate or dial.

3. In a weighing-scale, the body, the beam F, fulcrumed therein, the bar D, provided with means for supporting the load, the link E, connecting the bar and beam at one end, the link E', fulcrumed to the opposite end of bar D, and a horizontal adjustable bearing $e$, mounted in the beam F and carrying the upper end of link E', whereby the differential leverage upon the beam may be varied.

4. The beam F, the pointer and its pinion, the arm H, pivotally connected to the beam F and suitably guided, the arm I, pivoted to arm H, and the spring $h^6$, all combined substantially as shown.

In testimony whereof I hereunto set my hand, this 29th day of April, 1889, in the presence of two attesting witnesses.

CHARLES C. STUART.

Witnesses:
J. H. GASKILL,
JOSEPH S. GIBSON.